United States Patent [19]
Morita

[11] Patent Number: 5,177,792
[45] Date of Patent: Jan. 5, 1993

[54] COLLATION OF A STREAKED PATTERN AT A HIGH SPEED

[75] Inventor: Koichiro Morita, Tokyo, Japan

[73] Assignee: NEC Corporation, Tokyo, Japan

[21] Appl. No.: 707,535

[22] Filed: May 30, 1991

[30] Foreign Application Priority Data

May 30, 1990 [JP] Japan .................. 2-140389
Nov. 14, 1990 [JP] Japan .................. 2-307990
Nov. 22, 1990 [JP] Japan .................. 2-320077

[51] Int. Cl.⁵ .......................................... G06K 9/00
[52] U.S. Cl. ........................................ 382/4; 382/5
[58] Field of Search ............. 382/4, 5, 34; 356/71

[56] References Cited

U.S. PATENT DOCUMENTS

| 4,310,827 | 1/1982 | Asai ........................... 382/5 |
| 4,944,021 | 7/1990 | Hoshino et al. ............... 382/4 |
| 5,040,223 | 8/1991 | Kamiya et al. ................ 382/4 |

Primary Examiner—Herbert Goldstein
Assistant Examiner—Yon Jung
Attorney, Agent, or Firm—Sughrue, Mion, Zinn, Macpeak & Seas

[57] ABSTRACT

On collating an input streaked pattern (fingerprint) with a reference streaked pattern, a local streak direction is extracted from a local area defined in the input streaked pattern by one of reference feature positions of reference feature points of the reference streaked pattern. Direction coincidence or non-coincidence is checked by comparing the extracted streak direction with a reference streak direction at the above-mentioned one reference feature position. If direction coincident, the presence or absence of one of the input feature points of the input streaked pattern is confirmed in the local area. If present, pattern coincidence is judged when a count of the input feature points reaches a threshold value. If the value is not reached, collation repeat and pattern non-coincidence is judged when all reference feature positions and streak directions are not yet or already used in extraction and subsequent check, respectively. If direction non-coincident, if absent, or if the collation should be repeated, extraction and check are continued by using different reference feature positions and streak directions. Preferably, the above-mentioned one reference feature position is used together with a position of an adjacent reference point and additionally with the number of reference streaks between the reference feature point and the adjacent reference feature point.

9 Claims, 10 Drawing Sheets

FIG. 11 — 33 WORK MEMORY, FEATURE POINT LIST

| | | | | |
|---|---|---|---|---|
| M1 | X1 | Y1 | D1 | A1 |
| M2 | X2 | Y2 | D2 | A2 |
| ⋮ | ⋮ | ⋮ | ⋮ | ⋮ |
| MN | XN | YN | DN | AN |

FIG. 13 — 33 WORK MEMORY, FEATURE POINT LIST

| | | | | | |
|---|---|---|---|---|---|
| M1 | X1 | Y1 | D1 | $x_1$ | $y_1$ |
| M2 | X2 | Y2 | D2 | $x_2$ | $y_2$ |
| ⋮ | ⋮ | ⋮ | ⋮ | ⋮ | ⋮ |
| MN | XN | YN | DN | $x_N$ | $y_N$ |

FIG. 15 — 33 WORK MEMORY, FEATURE POINT LIST

| | | | | | | |
|---|---|---|---|---|---|---|
| M1 | X1 | Y1 | D1 | $x_1$ | $y_1$ | R1 |
| M2 | X2 | Y2 | D2 | $x_2$ | $y_2$ | R2 |
| ⋮ | ⋮ | ⋮ | ⋮ | ⋮ | ⋮ | ⋮ |
| MN | XN | YN | DN | $x_N$ | $y_N$ | RN |

COLLATION OF A STREAKED PATTERN AT A HIGH SPEED

BACKGROUND OF THE INVENTION

This invention relates to a streaked pattern collating apparatus. As herein called, a streaked pattern is typically a fingerprint and may be a pattern drawn by a skilled technician after either a faint fingerprint remain or a latent fingerprint.

The streaked pattern collating apparatus comprises a collating unit supplied with an input pattern signal representative of an input streaked pattern having input streaks which are featured by a plurality of input feature points. The collating unit is for carrying out collation between the input streaked pattern and a reference streaked pattern having reference streaks in connection with a predetermined number of reference feature points which feature the reference streaks by reference feature positions and reference streak directions. The collating unit thereby produces a collation coincidence signal and a collation non-coincidence signal when the input streaked pattern coincides with the reference streaked pattern and when the input streaked pattern does not coincide with the reference streaked pattern, respectively. In other words, the collation coincidence and the collation non-coincidence signals represent coincidence and non-coincidence between the input and the reference streaked patterns, respectively.

The collating unit generally comprises a work memory for memorizing the reference feature positions as memorized points and the reference streak directions as memorized directions in correspondence to the reference feature points. Connected to the work memory, a reading section reads from the work memory, as a read-out feature position, one of the memorized positions that corresponds to one of the reference feature points. Simultaneously, the reading section reads from the work memory, as a read-out streak direction, one of the memorized directions that corresponds to the above-mentioned one of the reference feature points.

Connected to the reading section and supplied with the input pattern signal, a confirming section confirms whether or not one of the input feature points is present in a local area defined by the read-out feature position in the input streaked pattern. More specifically, the local area has a rectangular shape defined by the read-out streak direction in the manner which will become clear as the description proceeds. The confirming section thereby produces a presence confirmed signal and a presence non-confirmed signal when the above-mentioned one of the input feature points is present in the local area and when the above-mentioned one of the input feature points is not present in the local area, respectively.

A counting section is connected to the confirming section and has an initial count equal to zero. The counting section counts up the initial count to an increased count whenever the presence confirmed signal is produced. The counting section thereby produces a count signal representative of the increased count.

A count comparing section is connected to the counting section and has a threshold value. The count comparing section compares the increased count with the threshold value. The threshold value is greater than the initial count and is either equal to or less than the predetermined number of the reference feature points. The count comparing section thereby produces first and second compared result signals when the increased count is and is not less than the threshold value, respectively. The second compared result signal is for use as the collation coincidence signal.

Connected to the work memory and the reading, the confirming, and the count comparing sections, a judging section judges, in response to each of the presence non-confirmed signal and the first compared result signal, whether or not all of the memorized positions and all of the memorized directions are already read from the work memory. The judging section thereby produces an end signal and a non-end signal when all of the memorized positions and all of the memorized directions are already read and are not yet read from the work memory, respectively. The end signal is for use as the collation non-coincidence signal.

Responsive to the non-end signal, the reading section reads from the work memory, as the read-out feature position, a different one of the memorized positions that corresponds to a difference one of the reference feature points. Simultaneously, the reading section reads from the work memory, as the read-out streak direction, a different one of the memorized directions that corresponds to the different one of the reference feature points.

The streaked pattern collating apparatus is defective in that it is not possible to carry out the collation at a high speed. This is because the confirming section operates even in a case where the read-out streak direction does not coincide with a local streak direction of a part of the input streaks that is included in the local area.

SUMMARY OF THE INVENTION

It is therefore an object of this invention to provide a streaked pattern collating apparatus which can carry out collation of a streaked pattern at a high speed.

Other objects of this invention will become clear as the description proceeds.

On describing the gist of this invention, it is possible to understand that a streaked pattern collating apparatus comprises a collating unit supplied with an input pattern signal representative of an input streaked pattern featured by a plurality of input feature points. The collating unit is for carrying out collation between the input streaked pattern and a reference streaked pattern in connection with a predetermined number of reference feature points which feature the reference feature pattern by reference feature positions and reference streak directions. The collating unit produces collation coincidence and collation non-coincidence signals representing coincidence and non-coincidence between the input and the reference streaked patterns.

According to this invention, the collating unit comprises in the above-understood streaked pattern collating apparatus: (A) memorizing means for memorizing the reference feature positions as memorized positions and the reference streak directions as memorized directions in correspondence to the reference feature points; (B) reading means connected to the memorizing means for reading from the memorizing means, as a read-out feature position, a particular one of the memorized positions that corresponds to a particular one of the reference feature points and for reading from the memorizing means, as a read-out streak direction, a particular one of the memorized directions that corresponds to the particular one of the reference feature points; (C) direction extracting means connected to the reading means and supplied with the input pattern signal for extracting, as an extracted streak direction, a local streak direction from a local area defined by the read-out feature position in the input streaked pattern; (D) direction comparing means connected to the reading and the direction extracting means for comparing the extracted streak direction with the read-out streak direction to produce direction coincidence and direction non-coincidence signals representing coincidence and non-coincidence between the extracted streak direction and the read-out streak direction; (E) confirming means connected to the reading and the direction comparing means and supplied with the input pattern signal for confirming, in response to the direction coincidence signal, whether or not one of the input feature points is present in the local area, the confirming means producing presence confirmed and presence non-confirmed signals representing presence and absence of the above-mentioned one of the input feature points in the local area; (F) primary counting means connected to the confirming means and having a primary initial count equal to zero for counting up the primary initial count to a primary increased count whenever the presence confirmed signal is produced, the primary counting means producing a primary count signal representative of the primary increased count; (G) primary count comparing means connected to the primary counting means and having a primary threshold value for comparing the primary increased count with the primary threshold value, the primary threshold value being greater than the primary initial count and not greater than the predetermined number of reference feature points, the primary count comparing means producing first and second primary compared result signals when the primary increased count is and is not less than the primary threshold value, respectively, the second primary compared result signal being for use as the collation coincidence signal; and (H) primary judging means connected to the memorizing, the reading, the direction comparing, the confirming, and the primary count comparing means for judging, in response to each of the direction non-coincidence signal, the presence non-confirmed signal, and the first primary compared result signal, whether or not all of the memorized positions and all of the memorized directions are already read from the memorizing means. The primary judging means produces an end signal and a non-end signal when all of the memorized positions and all of the memorized directions are already read and are not yet read from the memorizing means, respectively. The end signal is for use as the collation non-coincidence signal. The reading means is responsive to the non-end signal for reading from the memorizing means, as the read-out feature position, a different one of the memorized positions that corresponds to a different one of the reference feature points and for reading from the memorizing means, as the read-out streak direction, a different one of the memorized directions that correspond to the different one of the reference feature points.

BRIEF DESCRIPTION OF THE DRAWING

FIG. 11 is a block diagram for use in describing another work memory which can be used in a collating unit included in the streaked pattern collating apparatus illustrated in FIG. 1;

FIG. 13 is a block diagram for use in describing still another work memory which can be used in a collating unit included in the streaked pattern collating apparatus illustrated in FIG. 1;

FIG. 15 is a block diagram for use in describing a different work memory which can be used in a collating unit included in the streaked pattern apparatus illustrated in FIG. 1.

DESCRIPTION OF THE PREFERRED EMBODIMENT

Figure 1:
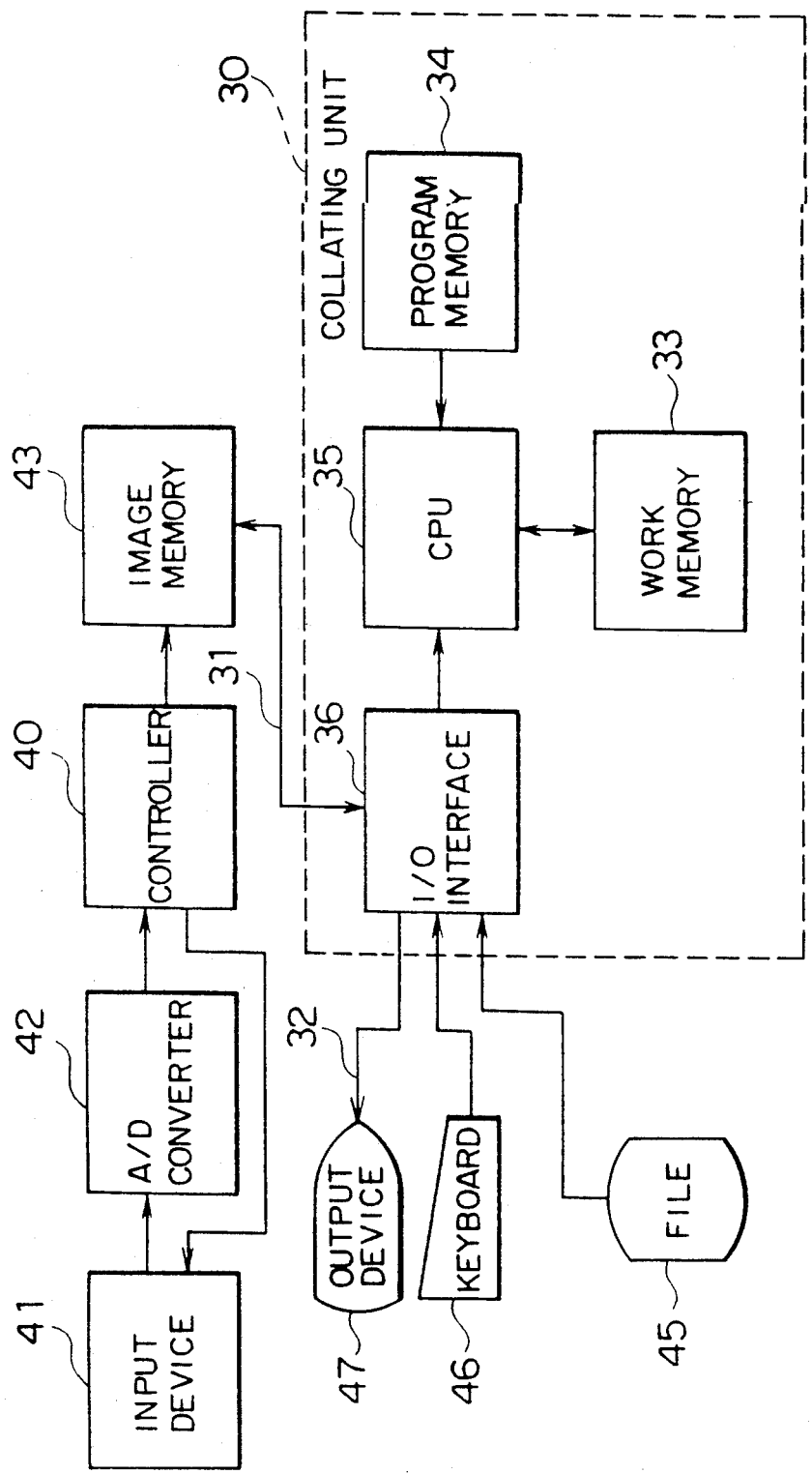
FIG. 1 is a block diagram of a streaked pattern collating apparatus according to an embodiment of this invention.

Referring to FIG. 1, a streaked pattern collating apparatus according to a preferred embodiment of this invention comprises a collating unit 30 supplied with an input pattern signal 31 representative of an input streaked pattern which has input streaks and which are featured by a plurality of input feature points. A reference streaked pattern has reference streaks. The collating unit 30 is for carrying out collation between the input streaked pattern and the reference streaked pattern in connection with a predetermined number N (N representing an integer greater than one) of reference feature points M1, . . . , and MN which feature the reference feature pattern by reference feature positions (X1, Y1), . . . , and (XN,YN) and reference streak directions D1, . . . , and DN. When a streaked pattern is a fingerprint, streaks and named ridges. Futhermore, feature points are called minutiae.

The collating unit 30 produces, as a collation result signal 32, a collation coincidence signal and a collation non-coincidence signal when the input streaked pattern coincides with the reference feature streaked pattern and when the input streaked pattern does not coincide with the reference feature streaked pattern, respectively. The collation coincidence and the collation non-coincidence signals represents coincidence and non-coincidence between the input and the reference streaked patterns, respectively.

Figures 2, 3:
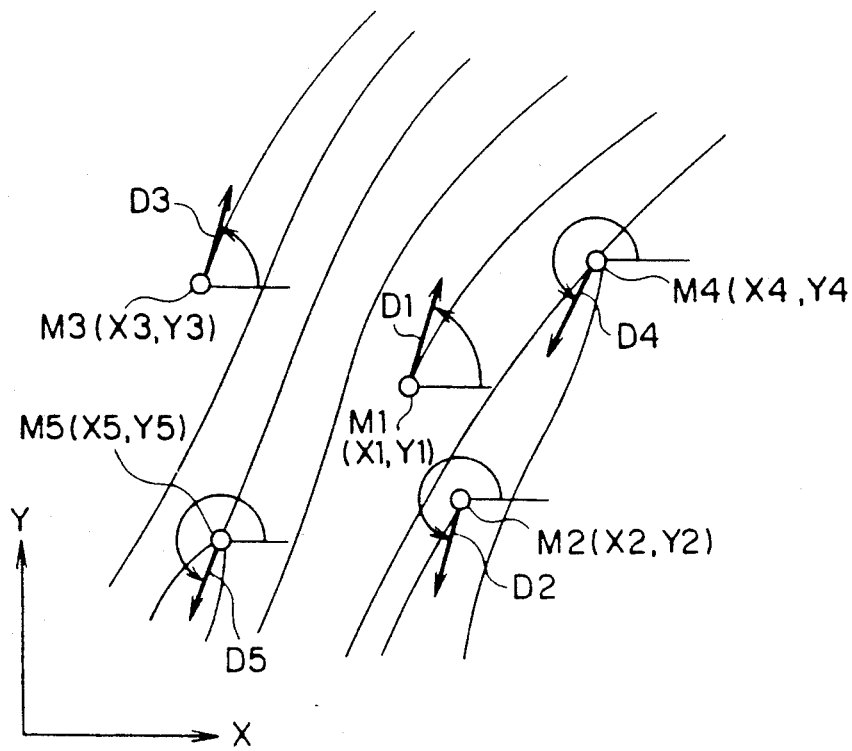
FIG. 2 is a diagram for use in describing a reference streaked pattern.
FIG. 3 is a block diagram for use in describing a work memory of a collating unit included in the streaked pattern collating apparatus illustrated in FIG. 1.

Turning to FIG. 2, a partial pattern of the reference streaked pattern has the reference feature points M1, M2, and M3, each of which is an abrupt ending of a streak. The partial pattern futher has the reference feature points M4 and M5, each of which is a bifurcation of a streak. The reference streaked pattern may have a crosspoint of two or more streaks as one of the reference feature points when the streaked pattern is a general streaked pattern other than a fingerprint.

The reference feature points M1 to M5 have the respective reference feature positions (X1,Y1) to (X5,Y5) on an X-Y coordinate system defined on the reference streaked pattern. As described in U.S. Pat. No. 4,310,827 issued to Koh Asai and assigned to NEC Corporation, each of the reference directions D1 to D5 of the reference feature points M1 to M5 is defined by a direction vector extended from the reference feature point under consideration. It will be assumed that each of the reference directions D1 to D5 of the reference feature points M1 to M5 is represented by an angle defined from a line parallel to an X-axis of the X-Y coordinate system to the direction vector of the reference feature point in a counterclockwise direction on the X-Y coordinate system.

Referring to FIG. 3 afresh and FIG. 1 again, the collating unit 30 comprises a work memory 33 for memorizing a feature point list for the reference streaked pattern as a memorized list. More specifically, the work memory 33 memorizes the reference feature positions (X1,Y1) to (XN,YN) as memorized positions and the reference streak directions D1 to DN as memorized directions in correspondence to the reference feature points M1 to MN.

In FIG. 1, the collating unit 30 further comprises a program memory 34 for memorizing an operation program. A CPU (central processing unit) 35 is connected to the work memory 33 and the program memory 34. Supplied with the input pattern signal 31 through an I/O (input/output) interface 36, the CPU 35 carries out the collation under control of the operation program and produces the collation result signal 32 through the I/O interface 36 in the manner which will later be described.

The streaked pattern collating apparatus further comprises a controller 40 and an input device 41 which produces, under control of the controller 40, a two-dimensional photoelectrically converted image of an object pattern. The input device 41 is known in the art. Connected to the input device 41, an A/D (analog/digital) converter 42 converts the two-dimensional photoelectrically converted image into a digital (namely, guantized) image signal. The controller 40 stores the digital image signal in an image memory 43 as a stored image signal. In response to a read signal (unnumbered) produced by the CPU 35 under control of the operation program and supplied through the I/O interface 36, the image memory 43 delivers the stored image back to the I/O interface 36 as the input pattern signal 31.

Figure 4:
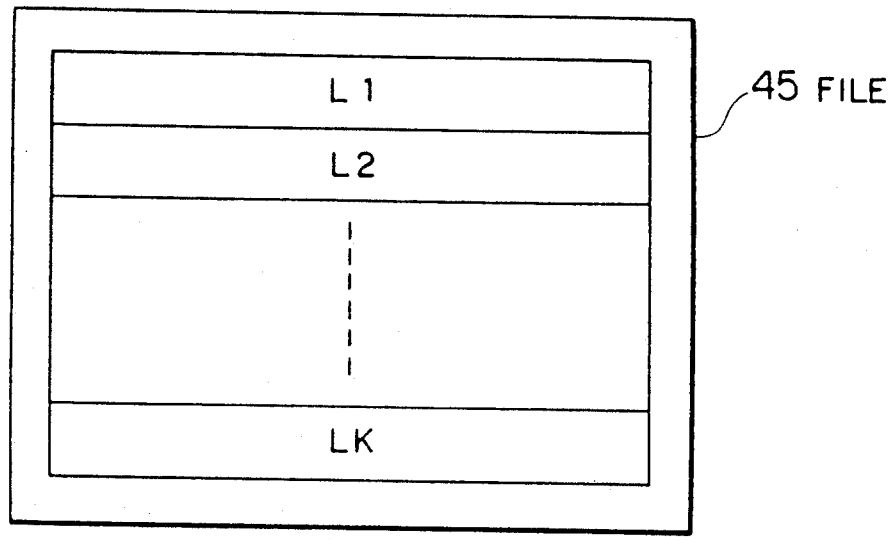
FIG. 4 is a block diagram for use in describing a file included in the streaked pattern collating apparatus illustrated in FIG. 1.

In FIG. 1, a file 45 is for preliminarily memorizing a preselected number K of feature point lists L1,..., and LK which are shown in FIG. 4 and each of which is exemplified in FIG. 3. A keyboard 46 is for inputting an identification number representative of a specific one of a feature point lists L1 to LK of the file 45 in the collating unit 30 to make the work memory 33 memorize the specific one of the feature point lists L1 to LK as the memorized list. An output device 47 is for visually displaying a collation result in response to the collation result signal 32.

Figure 5:
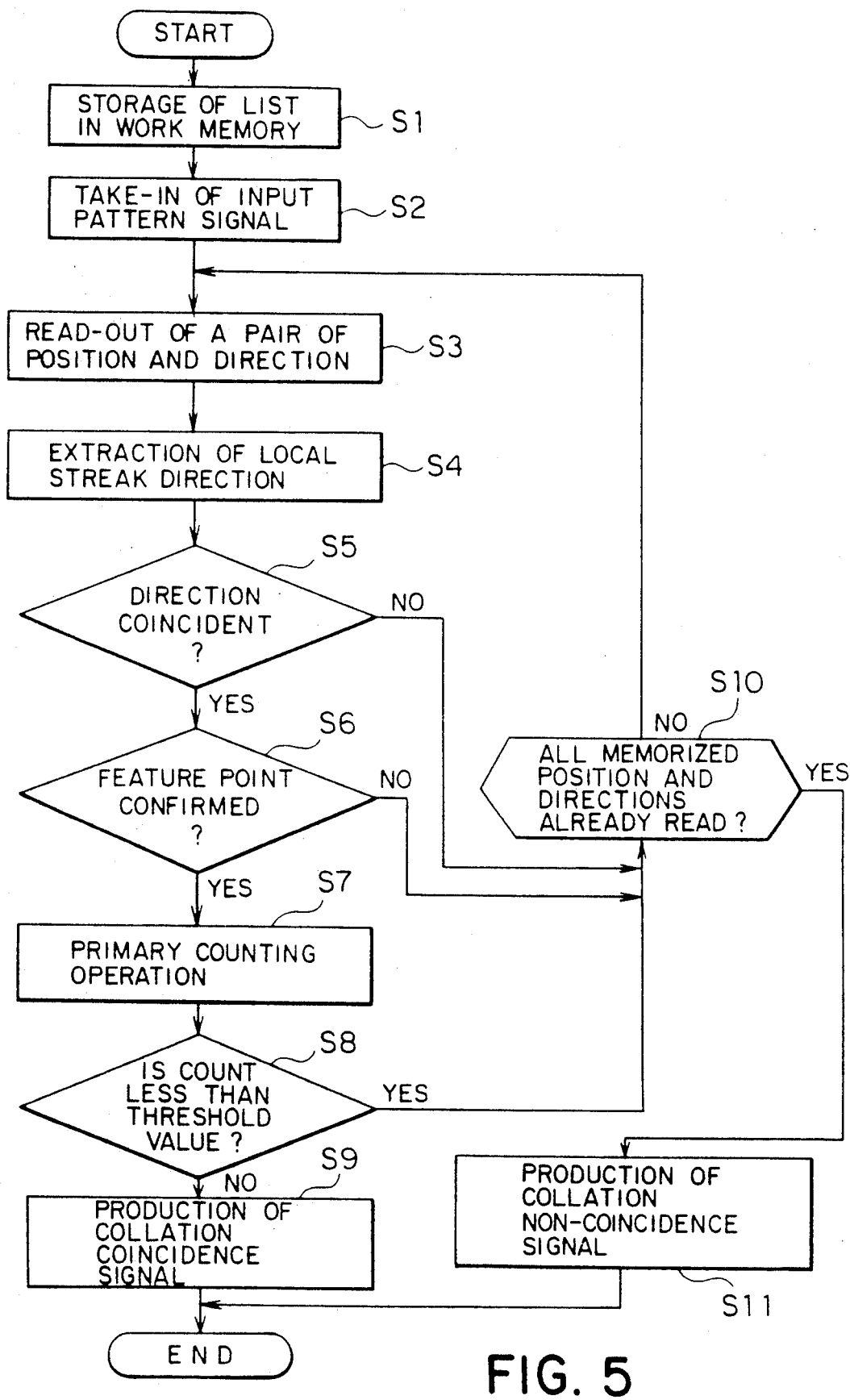
FIG. 5 is a flow chart for use in describing operation of the streaked pattern collating apparatus illustrated in FIG. 1.

Turning to FIG. 5 with reference to FIGS. 1, 3, and 4 continued, description will proceed to operation of the streaked pattern collating apparatus. At a first stage S1, the keyboard 46 is operated by an operator to input the identification number in the collating unit 30. When the CPU 35 receives the identification number through the I/O interface 36, the CPU 35 reads from the file 45 a specific one of the feature point lists L1 to LK that is designated by the identification number. The CPU 35 stores the specific one of the feature point lists L1 to LK in the work memory 33. As a result, the work memory 33 memorizes the specific one of the feature point lists L1 to LK as the memorized list as exemplified in FIG. 3. The first stage S1 is followed by a second stage S2.

At the second stage S2, the CPU 35 delivers the read signal to the image memory 43 through the I/O interface 36 to make the image memory 43 deliver the input pattern signal 31 back to the CPU 35 through the I/O interface 36. That is, the CPU 35 takes in the input pattern signal 31.

At a third stage S3 which follows the second stage S2, the CPU reads a particular one of the memorized positions from the work memory 33 as a read-out feature position. The particular one of the memorized positions corresponds to a particular one of the reference feature points M1 to MN. Simultaneously, the CPU 35 reads a particular one of the memorized directions from the work memory 33 as a read-out streak direction. The particular one of the memorized directions corresponds to the particular one of the reference feature points M1 to MN. When the particular one of the reference feature points M1 to MN is the reference feature point M1, the CPU 35 reads the reference feature position (X1,Y1) and the reference streak direction D1 from the work memory 33.

Thus, the CPU 35 serves at the third stage S3 as a reading section. The reading section is connected to the work memory 33 for reading from the work memory 33, as a read-out feature position, a particular one of the memorized positions that corresponds to a particular one of the reference feature points M1 to MN and for reading from the work memory 33, as a read-out streak direction, a particular one of the memorized streak directions that corresponds to the particular one of the refrence feature points M1 to MN.

A fourth stage S4 succeeds the third stage S3. At the fourth stage S4, the CPU 35 is supplied with the input pattern signal 31 and extracts, as an extracted streak direction, a local streak direction from a part of the input streaks that is included in a local area defined by the read-out feature position in the input streaked pattern.

Figure 6:
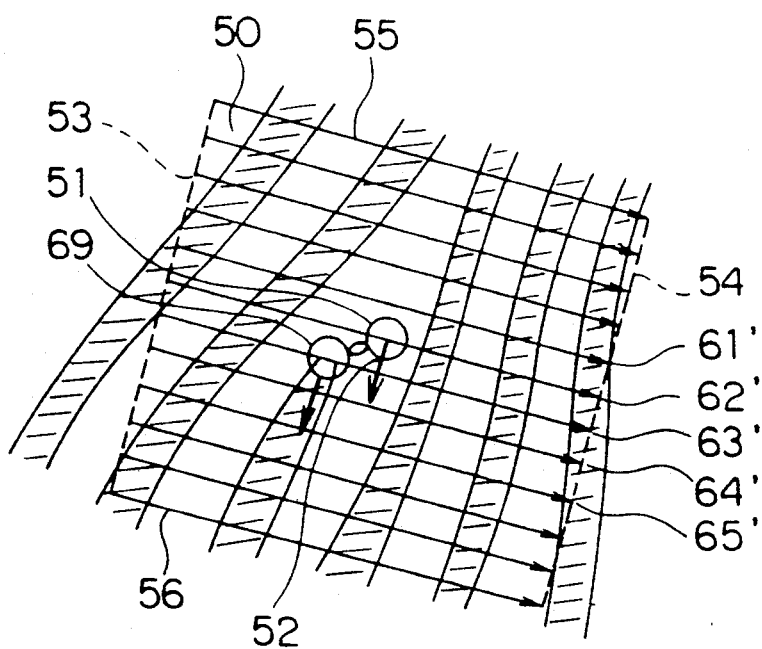
FIG. 6 is a diagram for use in describing operation of the streaked pattern collating apparatus illustrated in FIG. 1.

Turning to FIG. 6 during a short while, the local area of the input streaked pattern is depicted at a reference numeral 50 and has a center point corresponding to the read-out feature position depicted at another reference numeral 51. The streaks or ridges are depicted in the local area 50 by hatched areas.

More specifically, the local area 50 has a rectangular shape defined by the read-out streak direction indicated by an arrow 52. That is, the local area 50 of a rectangular shape (which is typically a square shape) has a pair of longitudinal boundary lines 53 and 54 and another pair of transverse boundary lines 55 and 56. The longitudinal boundary lines 53 and 54 are parallel to each other and are parallel to the read-out streak direction 52. The transverse boundary lines 55 and 56 are parallel to each other and are perpendicular to the read-out streak direction 52.

The local streak direction can be extracted as the extracted streak direction from the local area 50 in the manner described in the above-referred U.S. Pat. No. 4,310,827.

Figure 7:
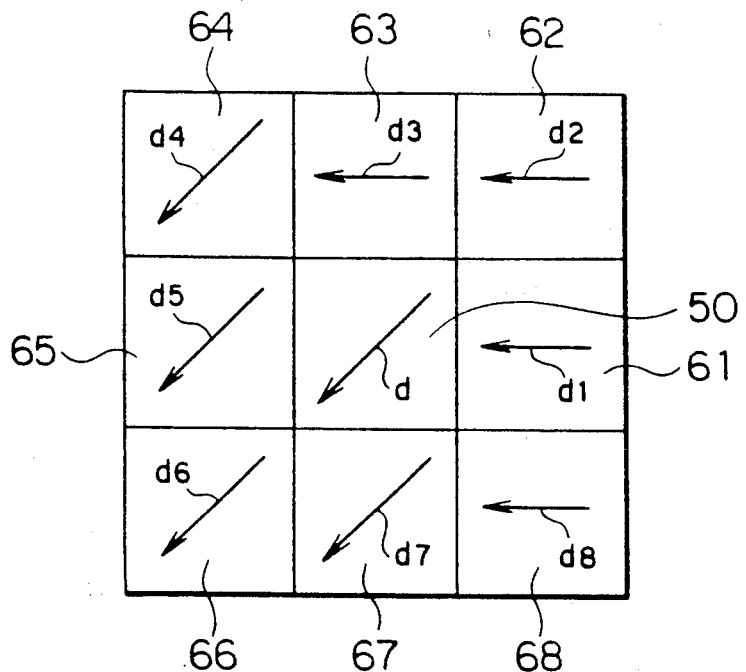
FIG. 7 is another diagram for use in describing operation of the streaked pattern collating apparatus illustrated in FIG. 1.

Turning further to FIG. 7, the extracted streak direction may be extracted as an averaged direction d(ave) obtained by Equation (1) hereunder:

$$d(ave) = (a \cdot d - d1 - d2 - d3 - d4 - d5 - d6 - d7 - d8)/Q. \quad (1)$$

In Equation (1), d represents and extracted streak direction extracted from the above-defined local aerea 50 in the input streaked pattern and d1, ..., and d8 represents other extracted streak directions extracted from adjacent local areas 61, ..., and 68, respectively, which are defined adjacently of the local area 50 in the input streaked pattern. Furthermore, a represents a weight constant having a positive integer which is equal to, for example, two. In addition, Q represents another integer which is equal to eight plus the positive integer.

Reviewing FIG. 1, 5, and 6, the CPU 35 is operable at the fourth stage S4 as a direction extracting section. Connected to the reading section and supplied with the input pattern signal 31, the direction extracting section extracts, as an extracter streak direction, the local streak direction from the local area 50 defined by the read-out feature position 51 in the input streaked pattern.

Turning back to FIG. 5 with reference to FIGS. 1 and 6 continued, a fifth stage S5 follows the fourth stage S4. At the fifth stage S5, the CPU 35 compares the extracted streak direction with the read-out streak direction 52 and produces direction coincidence and direction non-coincidence signals representing coincidence and non-coincidence between the extracted streak direction and the read-out streak direction 52, respectively. In the meanwhile, the CPU 35 produces the direction coincidence and the direction non-coincidence signals when the extracted streak direction and the read-out streak direction 52 form an angle which is not and is greater than a prescribed angle.

Thus, the CPU 35 serves at the fifth stage S5 as a direction comparing section. Connected to the reading and the direction extracting sections, the direction comparing section compares the extracted streak direction with the read-out streak direction 52 to produce direction coincidence and direction non-coincidence signals representing coincidence and non-coincidence between the extracted streak direction and the read-out streak direction 52. More exactly, the direction comparing section produces the direction coincidence and the direction non-coincidence signals when the extracted streak direction and the read-out streak direction 52 form the angle which is not and is greater than the prescribed angle.

When the direction coincidence signal is produced at the fifth stage S5, the fifth stage S5 is succeeded by a sixth stage S6 which will presently be described. When the direction non-coincidence signal is produced at the fifth stage S5, the fifth stage S5 is succeeded by a different subsequent stage which will later be described.

With reference to FIGS. 1, 5, and 6 continued, description will now be made as regards operation of the CPU 35 at the sixth stage S6. At the sixth stage S6, the CPU 35 is supplied with the input pattern signal 31 and confirms, in response to the direction coincidence signal, whether or not a particular one of the input feature points is present in the local area 50. The CPU 35 thereby produces presence confirmed and presence non-confirmed signals representing presence and absence of the particular one of the input feature points in the local area 50. In the example being illustrated in FIG. 6, an abrupt ending 69 is confirmed in the local area 50 as the particular one of the input feature points.

Figure 8:
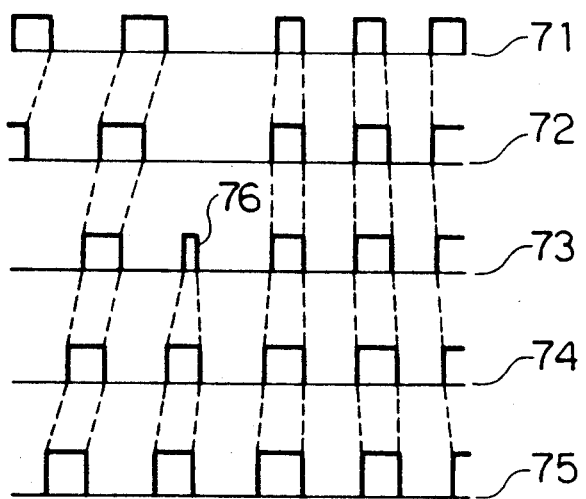
FIG. 8 is still another diagram for use in describing operation of the streaked pattern collating apparatus illustrated in FIG. 1.

In this event, the CPU 35 scans the local area 50 along a plurality of scanning lines depicted by parallel lines with arrowheads, seven of which are designated by reference numerals 55, 61' to 65', and 56 in FIG. 6. The scanning lines are perpendicular to the read-out streak direction 52. By scanning the local area 50 along the scanning lines 61' to 65', the CPU 35 obtains scanned data 71 to 75 shown in FIG. 8. In the example illustrated in FIG. 8, the abrupt ending 69 (FIG. 6) is confirmed at a scanned data portion 76.

Reviewing FIGS. 1, 5, and 6, the CPU 35 is operable at the sixth stage S6 as a confirming section. Connected to the reading and the direction comparing section and supplied with the input pattern signal 31, the confirming section confirms, in response to the direction coincidence signal, whether or not a particular one of the input feature points is present in the local area 50. The confirming section thereby produces presence confirmed and presence non-cofirmed signals representing presence and absence of the particular one of the input feature points in the local area 50.

When the presence confirmed signal is produced at the sixth stage S6, the sixth stage S6 is followed by a seventh stage S7 which will presently be described. When the presence non-confirmed signal is produced at the sixth stage S6, the sixth stage S6 is followed by the different subsequent stage which will later be described.

With reference to FIGS. 1 and 5 continued, description will now be made as regards operation of the CPU 35 at the seventh stage S7. At the senventh stage S7, the CPU 35 has a primary initial count equal to zero and counts up the primary initial count to a primary increased count whenever the presence confirmed signal is produced. The CPU 35 thereby produces a primary count signal representative of the primary increased count.

Thus, the CPU 35 serves at the seventh stage S7 as a primary counting section. The primary counting section is connected to the confirming section and has the primary initial count equal to zero for counting up the primary initial count to the primary increased count whenever the presence confirmed signal is produced. The primary counting section produces the primary count signal representative of the primary increased count. The seventh stage S7 is succeeded by an eighth stage S8.

With reference to FIGS. 1 and 5 continued, description will now be made as regards operation of the CPU 35 at the eighth stage S8. At the eighth stage S8, the CPU 35 has a primary threshold value and compares the primary increased count with the primary threshold value. The primary threshold value is greater than the primary initial count and is not greater than the predetermined number N of reference feature points M1 ro MN (FIG. 3). The CPU 35 produces first and second primary compared result signals when the primary increased count is and is not less than the primary threshold value, respectively.

Thus, the CPU 35 is operable at the eighth stage S8 is a primary count comparing section connected to the primary counting section. The primary count comparing section has the primary threshold value which is greater than the primary initial count and is not greater than the predetermined number N of reference feature points M1 to MN (FIG. 3). The primary count comparing section compares the primary increased count with the primary threshold value to produce first and second primary compared result signals when the primary increased count is and is not less than the primary threshold value, respectively.

When the first primary compared signal is produced at the eighth stage S8, the eighth stage S8 is followed by the different subsequent stage which will later be described. When the second primary compared signal is produced at the eighth stage S8, the eighth stage S8 is followed by a ninth stage S9 which will be described below.

At the ninth stage S9, the CPU 35 produces, in response to the second primary compared result signal, the collation coincidence signal and delivers, as the collation result signal 32, the collation coincidence signal to the output device 47 through the I/O interface 36.

Referring to FIGS. 1, 3, and 5, description will proceed to operation of the CPU 35 at a tenth stage S10 which is referred to above as the different subsequent stage. At the tenth stage S10, the CPU 35 judges, in response to each of the direction non-coincidence signal, the presence non-confirmed signal, and the first primary compared result signal, whether or not all of the memorized positions for all reference feature points M1 to MN and all of the memorized directions for all reference feature points M1 to MN are already read from the work memory 33. The CPU 35 thereby produces an end signal and non-end signal when all of the momorized positions and all of the momorized directions are already read and are not yet read from the work memory 33, respectively.

Thus, the CPU 35 serves at the tenth stage S10 as a primary judging section connected to the work memory 33 and the reading, the direction comparing, the confirming, and the primary count comparing sections. The primary judging section judges, in response to each of the direction non-coincidence signal, the presence non-confirmed signal, and the first primary compared result signal, whether or not all of the memorized positions and all of the memorized directions are already read from the work memory 33. The primary judging section produces the end signal and the non-end signal when all of the memorized positions and all of the memorized directions are already read and are not yet read from the memory 33, respectively.

When the signal is produced at the tenth stage S10, the tenth stage S10 is succeeded by an eleventh state S11. At the eleventh stage S11, the CPU 35 produces, in response to the end signal, the collation non-coincidence signal and delivers, as the collation result signal 32, the collation non-coincidence signal to the output device 47 through the I/O interface 36.

When the non-end signal is produced at the tenth stage S10, the tenth stage S10 returns bace to the third stage S3. At the third state S3, the CPU 35 is also responsive to the non-end signal to read from the work memory 33, at the read-out feature position, a different one of the memorized positions and to read from the work memory 33, as the read-out streak direction, a different one of the memorized directions. Each of the different one of the memorized positions and the different one of the memorized directions corresponds to the different one of the reference feature points M1 to MN.

Thus, the reading section is also responsive to the non-end signal for reading from the work memory 33, as the read-out feature position, the different one of the memorized positions that corresponds to the different one of the reference feature points M1 to MN and for reading from the work memory 33, as the read-out streak direction, the different one of the memorized directions that corresponds to the different one of the reference feature points M1 to MN.

Figure 9:
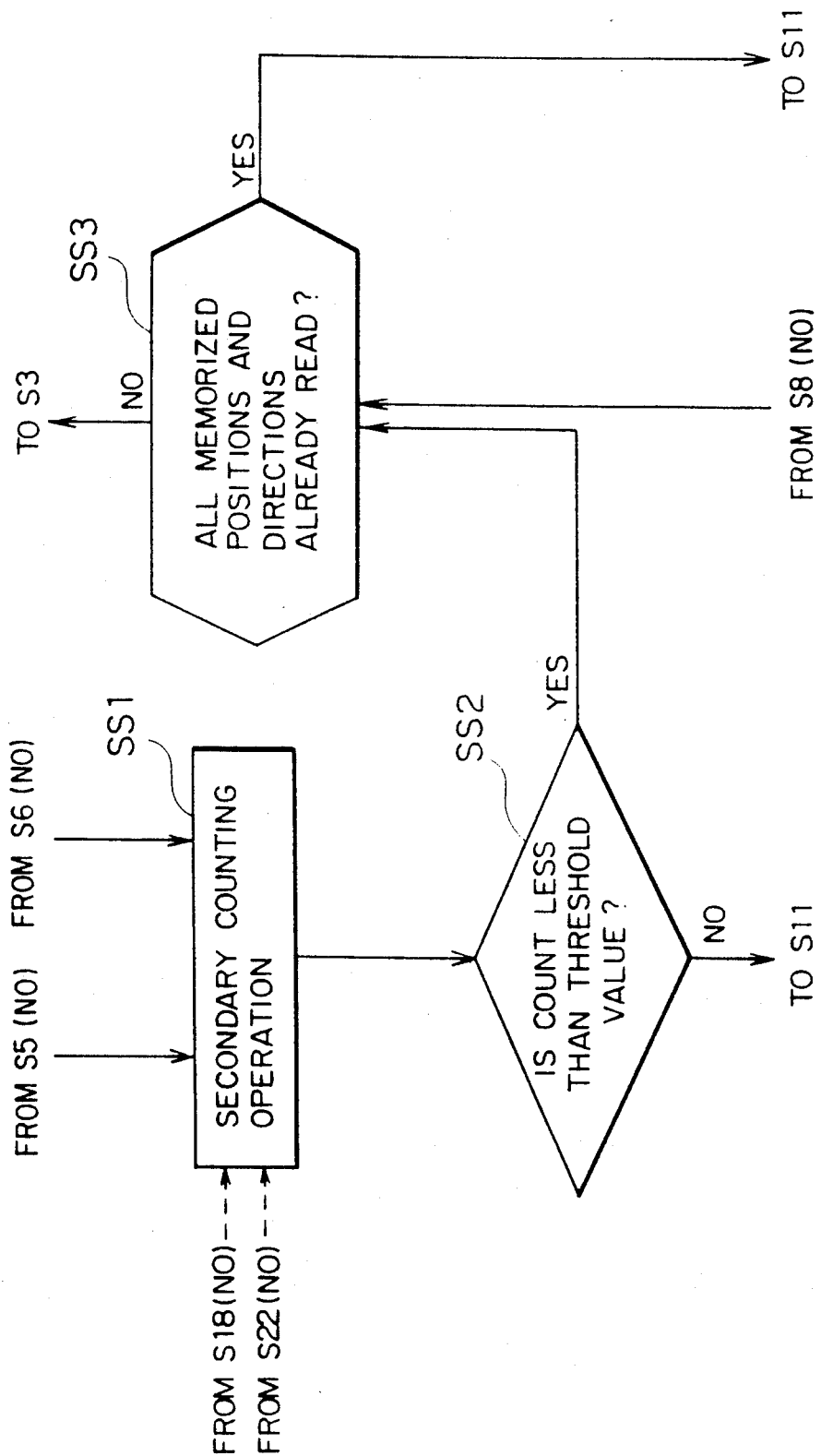
FIG. 9 is a partial flow chart for use in describing a different mode of operation of the streaked pattern collating apparatus illustrated in FIG. 1.

Turning to FIG. 9 with reference to FIG. 1 continued, first and other subsidiary stages SS1 and so forth are substituted for the tenth staged S10 illustrated in FIG. 5 in a different mode of operation of the CPU 35. At the first subsidiary state SS1, the CPU 35 has a secondary initial count equal to zero and counts up the secondary initial count to a secondary increased count whenever each of the direction non-coincidence signal and the presence non-confirmed signal is produced. The CPU 35 thereby produces a secondary count signal representative of the secondary increased count.

Thus, the CPU 35 serves at the first subsidiary statges SS1 as a secondary counting section which is connected to the direction comparing and the confirming sections and which has the secondary initial count equal to zero. The secondary counting section counts up the secondary initial count to the secondary increased count whenever each of the direction non/coincidence signal and the presence non-confirmed signal is produced. The secondary counting section thereby produces the secondary count signal representative of the secondary increased count.

At a second subsidiary stage SS2 which follows the first subsidiary stage SS1, the CPU 35 has a secondary threshold value and compares the secondary increased count with the secondary threshold value. The secondary threshold value is greater than the secondary initial count and is not greater than the predetermined number N of feature points M1 to MN (FIG. 3). The CPU 35 thereby produces first and second secondary compared result signals when the scondary increased count is and is not less than the secondary thereshold value. respectively. The second secondary compared result signal is produced as the collation non-coincidence signal at the eleventh stage S11.

Thus, the CPU 35 is operable at the second subsidiary stage SS2 as a secondary count comparing section which is connected to the secondary counting section and has a secondary thereshold value. The secondary count comparing section compares the secondary increased count with the secondary threshold value. The secondary threshold value is greater than the secondary initial count and is not greater than the predetermined number N of feature points M1 to MN. The secondary count comparing section thereby produces first and second secondary compared result signals when the secondary increased count is and is not less than the secondary thereshold value, respectively. The second secondary compared result signal is for use as the collation non-coincidence signal.

At a third subsidiary stage SS3 which succeeds the second subsidiary stage SS2, the CPU judges, in response to any one of the first primary and the first secondary compared result signals, whether or not all of the memorized positions and all of the memorized directions are already read from the work memory 33. The CPU 35 produces the end signal and non-end siganl when all of the memorized positions and all of the memorized directions are already read and are not yet read from the work memory 33, respectively.

Thus, the CPU 35 serves at the third subsidiary stage SS3 as a secondary judging section. Connected to the secondary count comparing section, the secondary judging section judges, in response to the first secondary compared result signal, whether or not all of the memorized positions and all of the memorized directions are already read from the work memory 33. The secondary judging section thereby produces the end signal and the non-end signal when all of the memorized positions and all of the memorized directions are already read and are not yet read from the work memory 33, respectively.

Figure 10:
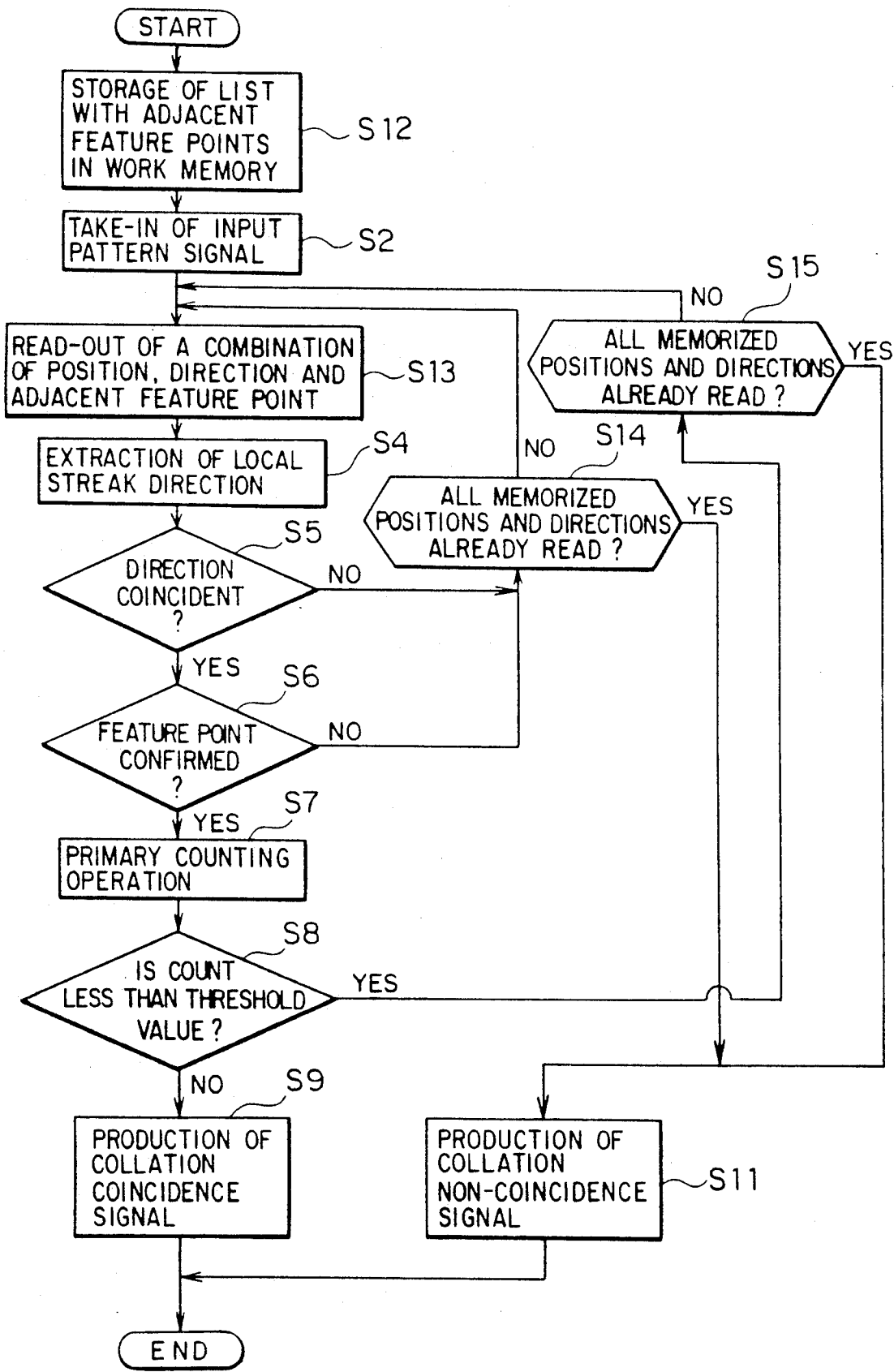
FIG. 10 is a flow chart for use in describing a different operation of the streaked pattern collating apparatus illustrated in FIG. 1.

Turning to FIG. 10 with reference to FIG. 1 continued, description will proceed to another operation of the streaked pattern collating apparatus illustrated in FIG. 1. In FIG. 10, twelfth and thirteenth stages S12 and S13 are substituted for the first and the third stages S1 and S3 illustrated in FIG. 5, respectively. A combination of fourteenth and fifteenth stages S14 and S15 is substituted for the tenth stage S10 illustrated in FIG. 5.

At the twelfth stage S12, the CPU 35 stores in the work memory 33 another feature point list exemplified in FIG. 11. That is, the work memory 33 illustrated in FIG. 11 memorizes the memorized positions, the memorized directions, and adjacent ones A1, ..., and AN of the reference feature points M1 to MN as memorized adjacent feature points in correspondence to the reference feature points M1 to MN. The adjacent one A1 to AN of the reference feature points M1 to MN are nearest to the reference feature points M1 to MN, respectively.

As the thirteenth stage S13, the CPU 35 reads from the work memory 33 the particular one of the memorized points as the read-out feature position, the particular one of the memorized directions as the read-out streak direction, and a particular one of the memorized adjacet feature points as a read-out adjacent feature point. The particular one of the memorized adjacent feature points corresponds to the particular one of the reference feature points M1 to MN.

Thus, the CPU 35 acts at the thirteenth stage S13 as the reading section. In this case, the reading section reads from the work memory 33 the particular one of the memorized points as the read-out feature position, the particular one of the memorized directions as the read-out streak direction, and the particular one of the memorized adjacent feature points as the read-out adjacent feature point. The particular one of the memorized adjacent feature points corresponds to the particular one of the reference feature points M1 to MN.

At the fourteenth stage S14, the CPU 35 judges, in response to each of the direction non-coincidence signal and the presence non-confirmed signal, whether or not all of the memorized positions and all of the memorized directions are already read from the work memory 33. The CPU 35 thereby produces the end signal and the non-end signal when all of the memorized positions and all of the memorized directions are already read and are not yet read from the work memory 33, respectively.

At the fifteenth stage S15, The CPU 35 judges, in response to the first primary compared result signal, whether or not all of the memorized positions and all of the memorized directions are already read from the work memory 33. The CPU 35 thereby produces the end signal and an adjacent point indication signal (which may briefly be called a point indication signal) indicative of a specific one of the reference feature points M1 to MN (FIG. 11) when all of the memorized positions and all of the memorized directions are already read and are not yet read from the work memory 33, respectively. The specific one of the reference feature points M1 to MN corresponds to the read-out adjacent feature point.

Thus, the CPU 35 serves at a combination of the fourteenth and the fifteenth stages S14 and S15 as the above-mentioned primary judging section. In this case, the primary judging section produces, as the non-end signal, the point indication signal indicative of the specific one of the reference feature points M1 to MN when the judging section judges in response to the first compared result signal that all of the memorized positions and all of the memorized directions are not yet read from the work memory. The specific one of the reference feature points M1 to MN corresponds to the read-out adjacent feature point.

At the thirteenth stage S13, the CPU 35 is responsive to the adjacent point indication signal and reads from the work memory 33, as the different one of the memorized positions, a specific one of the memorized positions that corresponds to the specific one of the reference feature points M1 to MN. Simultaneously, the CPU 35 reads from the work memory 33, as the different one of the memorized directions, a specific one of the memorized directions that corresponds to the specific one of the reference feature points M1 to MN. Furthermore, the CPU 35 reads from the work memory 33 to a specific one of the memorized adjacent feature points that corresponds to the specific one of the reference feature points M1 to MN. The CPU 35 thereby produces the specific one of the memorized positions, the specific one of the memorized directions, and the specific one of the memorized adjacent feature points as the read-out feature position, the read-out streak direction, and the read-out adjacent feature point, respectively.

Thus, the CPU 35 acts at the thirteenth stage S13 as the reading section which is responsive to the point indication signal for reading from the work memory 33, as the different one of the memorized positions, the specific one of the memorized positions that corresponds to the specific one of the reference feature points M1 to MN, for reading from the work memory 33, as the different one of the memorized directions, the specific one of the memorized directions that corresponds to the specific one of the reference feature points M1 to MN, and for reading from the work memory 33 the specific one of the memorized adjacent feature points that corresponds to the specific one of the reference feature points M1 to MN. The reading section thereby produces the specific one of the memorized positions, the specific one of the memorized directions, and the specific one of the memorized adjacent feature points as the read-out feature position, the read-out streak direction, and the read-out adjacent feature points, respectively.

Figure 12:
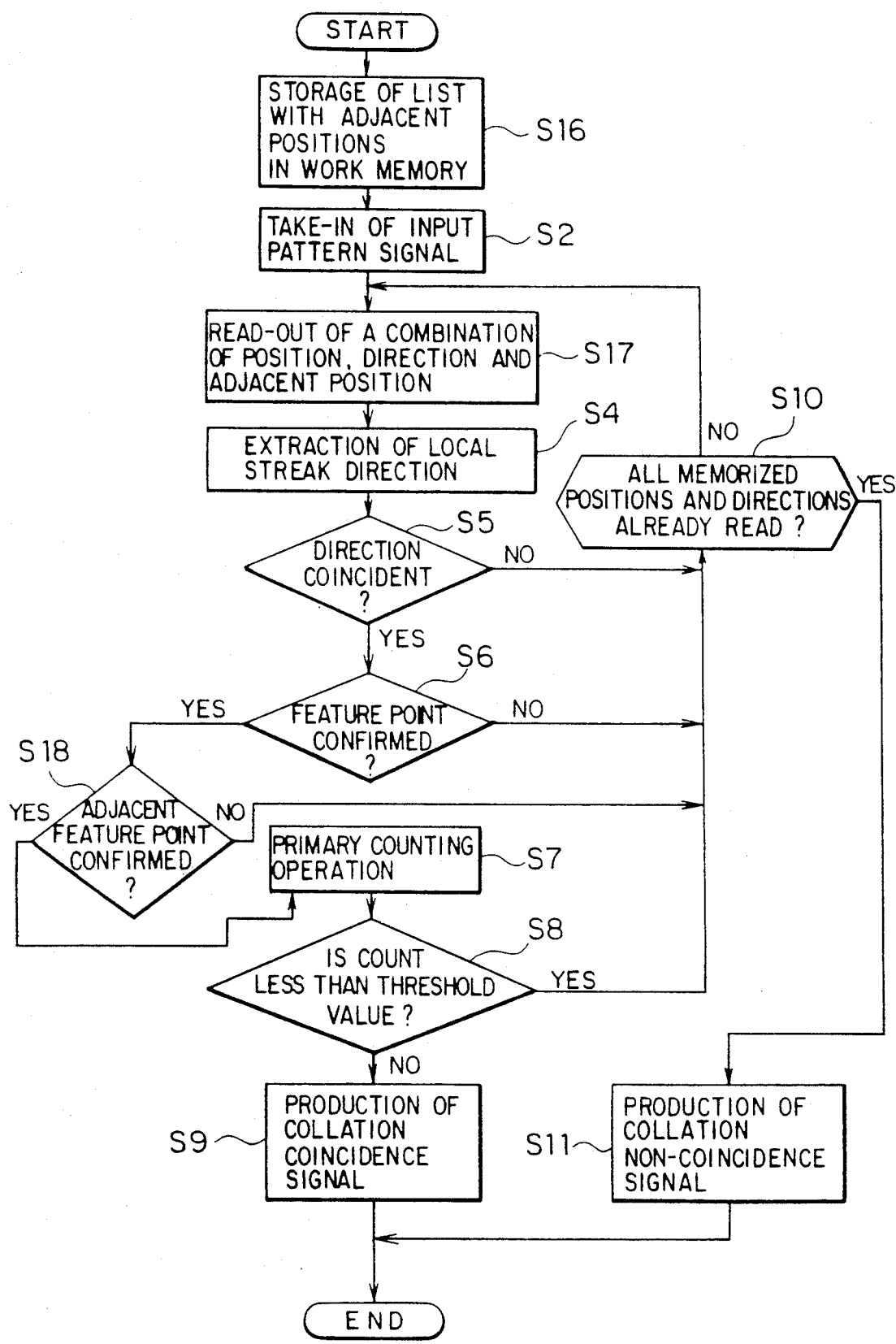
FIG. 12 is a flow chart for use in describing a further different operation of the streaked pattern collating apparatus illustrated in FIG. 1.

Turning to FIG. 12 with reference to FIG. 1 continued, description will proceed to still another operation of the streaked pattern collating apparatus illustrated in FIG. 1. In FIG. 12, sixteenth and seventeenth stages S16 and S17 are substituted for the first and the third stages S1 and S3 illustrated in FIG. 5, respectively. In addition, an eighteenth stage 18 is inserted between the sixth and the seventh stages S6 and S7 illustrated in FIG. 5.

At the sixteenth stage S16, the CPU 35 stores in the work memory 33 still another feature list exemplified in FIG. 13. That is, the work memory 33 illustrated in FIG. 13 memorizes the memorized positions, the memorized directions, and adjacent positions (x1,y1), . . . , and (xN,yN) of adjacent ones of the reference feature points M1 to MN as memorized adjacent positions in correspondence to the reference feature points M1 to MN. The adjacent ones of the reference feature points M1 to MN are nearest to the reference feature points M1 to MN, respectively.

At the seventeenth stage S17, the CPU 35 reads from the work memory 33, as a read-out feature position, a particular one of the memorized positions that corresponds to a particular one of the reference feature points M1 to MN. Simultaneously, the CPU 35 reads from the work memory 33, as a read-out streak direction, a particular one of the memorized directions that corresponds to the particular one of the reference feature points M1 to MN. Furthermore, the CPU 35 reads from the work memory 33, as a read-out adjacent position, a particular one of the memorized adjacent positions that corresponds to the particular one of the reference feature points M1 to MN.

Thus, the CPU 35 serves at the seventeenth stage S17 as a reading section connected to the work memory 33. The reading section is for reading from the work memory 33, as the read-out feature position, the particular one of the memorized positions that corresponds to the particular one of the reference feature points M1 to MN for reading from the work memory 33, as the read-out streak direction, the particular one of the memorized directions that corresponds to the particular one of the reference feature points M1 to MN, and for reading from the work memory 33, as the read-out adjacent position, the particular one of the memorized adjacent positions that corresponds to the particular one of the reference feature points M1 to MN.

As mentioned with reference to FIG. 5, the CPU 35 acts at the sixth stage S6 as a first confirming section connected to the reading and the direction comparing sections and supplied with the input pattern signal 31. The first confirming section confirms, in response to the direction coincidence signal, whether or not a particular one of the input feature points is present in the local area. The first confirming section produces first presence confirmed and first presence non-confirmed signals representing presence and absence of the particular one of the input feature points in the local area.

At the eighteenth stage 18 depicted in FIG. 12, the CPU 35 confirms, in response to the first presence confirmed signal, whether or not a different one of the input feature points is present in a different local area defined by the read-out adjacent position in the input streaked pattern. The CPU 35 thereby produces second presence confirmed and second presence non-confirmed signals representing presence and absence of the different one of the input feature points in the different local area.

Thus, the CPU 35 is operable at the eighteenth stage S18 as a second confirming section which is connected to the reading and the first confirming sections. Supplied with the input pattern signal 31, the second confirming section confirms, in response to the first presence confirmed signal, whether or not the different one of the input feature points is present in the different local area defined by the read-out adjacent position. The second confirming section thereby produces second presence confirmed and second presence non-confirmed signals representing presence and absence of the different one of the input feature points in the different local area.

At the seventh stage S7, the primary counting section is connected to the second confirming section for counting up the primary initial count to a primary increased count whenever the second presence confirmed signal is produced. The primary counting section thereby produces the primary count signal representative of the primary increased count like in the primary counting section illustrated in FIG. 5.

At the tenth stage S10, the primary judging section is also connected to the second confirming section. The primary judging section judges, in response to each of the direction non-coincidence signal, the first and the second presence non-confirmed signals, and the first primary compared result signal, whether or not all of the memorized positions and all of the memorized directions are already read from the work memory 33. The primary judging section thereby produces the end signal and the non-end signal when all of the memorized positions and all of the memorized directions are already read and are not yet read from the work memory 33, respectively.

Figure 14:
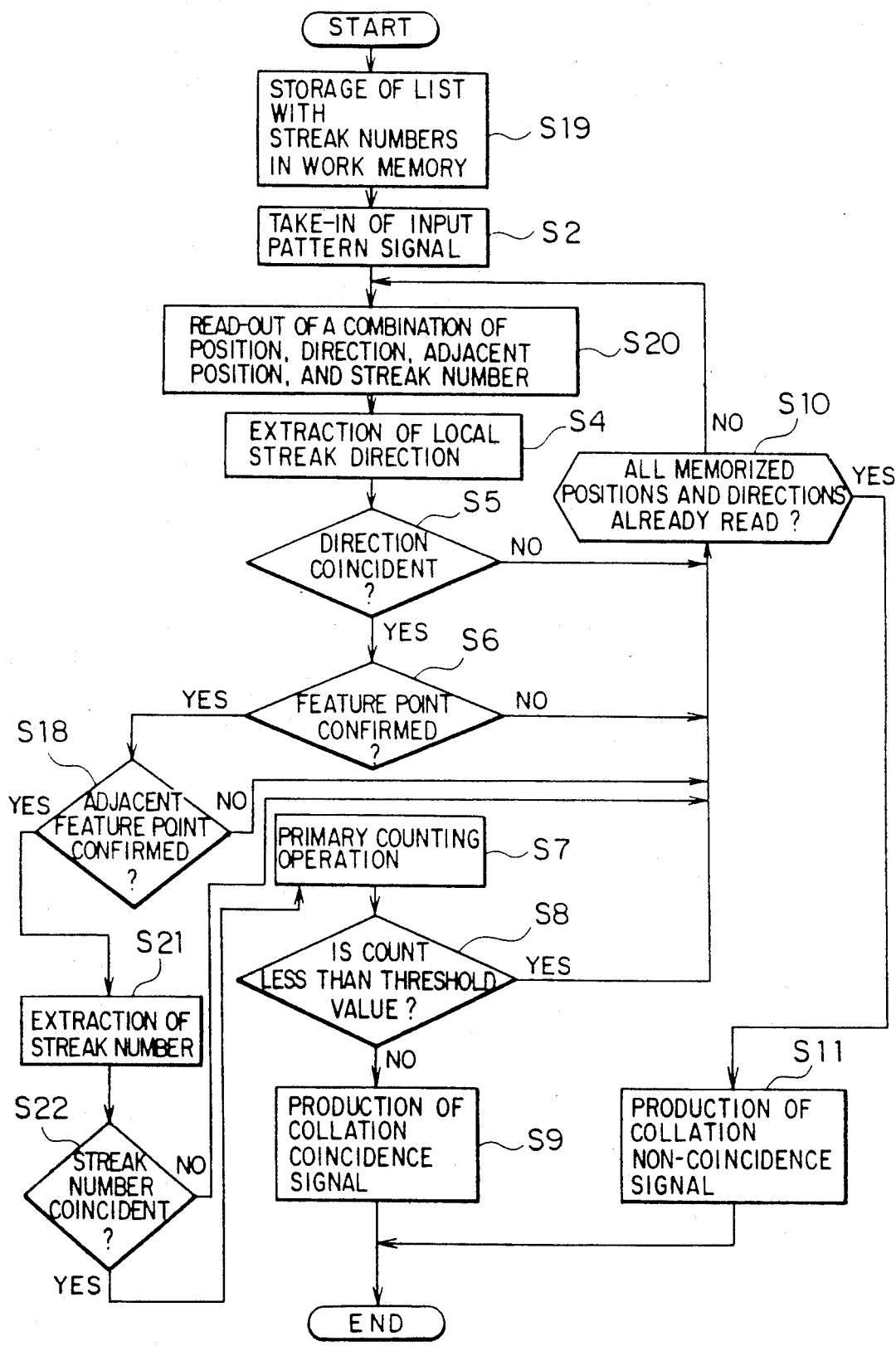
FIG. 14 is a flow chart for use in describing a still further different operation of the streaked pattern collating apparatus illustrated in FIG. 1.

Turning to FIG. 14 with reference to FIG. 1 continued, description will proceed to a different operation of the streaked pattern collating apparatus illustrated in FIG. 1. In FIG. 14, nineteenth and twentieth stages S19 and S20 are substituted for the sixteenth and seventeenth stages S16 and S17 illustrated in FIG. 12. In addition, twenty-first and twenty-second stages S21 and S22 are inserted between the eighteenth and the seventh stages S18 and S7 illustrated in FIG. 12.

At the nineteenth stage S19, the CPU 35 stores in the work memory 33 a still another feature list exemplified in FIG. 15. That is, the work memory 33 memorizes in FIG. 15 the memorized positions, the memorized directions, and the memorized adjacent positions, and local reference streak numbers R1, . . . and RN as memorized numbers in correspondence to the reference feature points M1 to MN. Each of the local reference numbers R1, . . . , and RN represents the number of local reference streaks between each of the reference feature points M1 to MN and one of the adjacent ones of the reference feature points M1 to MN that corresponds to the reference feature point in question.

At the twelfth stage S20, the CPU 35 reads from the work memory 33, as a read-out feature position, a particular one of the memorized positions that corresponds to a particular one of the reference feature points M1 to MN. Simultaneously, the CPU 35 reads from the work memory 33, as a read-out streak direction, a particular one of the memorized directions that corresponds to the particular one of the reference feature points M1 to MN. Furthermore, the CPU 35 reads from the work memory 33, as a read-out adjacent position, a particular one of the memorized adjacent positions that corresponds to the particular one of the reference feature points M1 to MN. Furthermore, the CPU 35 reads from the work memory 33, as a read-out local reference streak number, a particular one of the memorized numbers that corresponds to the particular one of the reference feature points M1 to MN.

Thus, the CPU 35 serves at the twentieth stage S20 as a reading section connected to the work memory 33. The reading section is for reading from the work memory 33, as a read-out feature position, a particular one of the memorized positions that corresponds to a particular one of the reference feature points M1 to MN, for reading from the work memory 33, as a read-out streak direction, a particular one of the memorized directions that corresponds to the particular one of the reference feature points M1 to MN, for reading from the work memory 33, as a read-out adjacent position, a particular one of the memorized adjacent positions that corresponds to the particular one of the reference feature points M1 to MN, and for reading from the work memory 33, as a read-out local reference streak number, a particular one of the memorized numbers that corresponds to the particular one of the reference feature points M1 to MN.

At the twenty-first stage S21 which follows the eighteenth stage S18, the CPU 35 extracts in response to the second presence confirmed signal, as an extracted local input streak number, the number of local input streaks between the particular one of the input feature points and the different one of the input feature points in the input streaked pattern.

Thus, the CPU 35 acts at the twenty-first stage S21 as a number extracting section. Connected to the reading and the second confirming sections and supplied with the input pattern signal 31, the number extracting section extracts in response to the second presence confirmed signal, as an extracted local input streak number, the number of local input streaks between the particular one of the input feature points and the different one of the input feature points in the input streaked pattern.

At the twenty-second stage S22 which follows the twenty-first stage S21, the CPU 35 compares the extracted local input streak number with the read-out local reference streak number to produce number coincidence and number non-coincidence signals representing coincidence and non-coincidence between the detected local input streak number and the read-out local reference streak number.

Thus, the CPU 35 serves at the twenty-second stage S22 as a number comparing section connected to the reading and the extracting sections. The number comparing section compares the extracted local input streak number with the read-out local reference streak number to produce number coincidence and number non-coincidence signals representing coincidence and non-coincidence between the extracted local input streak number and the read-out local reference streak number.

At the seventh stage S7 subsequent to the twenty-second stage S22, the primary counting section is connected to the number comparing section for counting up the primary initial count to the primary increased count whenever the number coincidence signal is produced. The primary counting section thereby produces the primary count signal representative of the primary increased count like in the primary counting section illustrated in FIG. 12.

At the tenth stage S10, the primary judging section is additionarily connected to the number comparing section. The primary judging section judges, in response to each of the direction non-coincidence signal, the first and the second presence non-confirmed signals, the number non-coincidence signal, and the first primary compared result signal, whether or not all of the memorized positions and all of the memorized directions are already read from the work memory 33. The primary judging section thereby produces the end signal and the non-end signal when all of the memorized positions and all of the memorized directions are already read and are not yet read from the work memory 33, respectively.

While this invention has thus far been described in specific conjunction with a single preferred embodiment thereof and with various modes or manners of operation of the collating unit 30, it will now be readily possible for one skilled in the art to carry this invention into effect in various other ways. Above all, it is possible to combine the various modes of operation in any possible ways. Typically, the subsidiary stages SS1 to SS3 of FIG. 9 are effective in raising correctness and precision of collation when used in the operation illustrated with reference to each of FIGS. 10, 12, and 14. When the subsidiary stages SS1 to SS3 of FIG. 9 are used in the operation illustrated with reference to FIG. 12, the secondary counting section carries out counting up at the first subsidiary stage SS1 whenever each of the direction non-coincidence signal, the first presence non-confirmed signal, and the second presence non-confirmed signal which is produced at the eighteenth stage S18 of FIG. 12. This is indicated in FIG. 9 by a broken line with an arrowhead. When the subsidiary stages SS1 to SS3 of FIG. 9 are used in the operation illustrated with reference to FIG. 14, the secondary counting section carries out counting up at the first subsidiary stage SS1 whenever each of the direction non-coincidence signal, the first presence non-confirmed signal, and the second presence non-confirmed and the number non-coincidence signals which are produced at the eighteenth and the twenty-second stages S18 and S22 of FIG. 14. This is indicated in FIG. 9 by broken lines, each with an arrowhead.

The file 45 may preferably be loaded with the reference feature positions, the reference streak directions, the adjacent positions of adjacent ones of the reference feature points, and the local reference streak numbers of various reference streaked patterns. In this event, it is possible to use the keyboard 46 in selecting one of the various reference streaked patterns as a selected streaked pattern for use in collation and in selecting a selected one of a first combination of the reference feature positions and the reference streak directions, a second combination of the first combination plus the adjacent positions, a third combination of the second combination plus the local reference streak numbers, and a like combination in the selected streaked pattern for use in storage of the selected one of the combinations in the work memory 33 in the manner described in connection with FIGS. 3, 11, 13, and 15. The adjacent ones of the reference feature points need not be the nearest ones. Instead, such an adjacent feature point adjacent to a reference feature point in a reference streaked pattern may be related in a predetermined manner to one of the reference feature points to which attention is directed. When it is unnecessary to select the selected one of the combinations and moreover when a fingerprint of an unknown person should be collated with file fingerprints kept in the file or files 45, the streaked pattern collating apparatus need not comprise the keyboard 46. The program memory 34 should, however, be used under the circumstances in selecting one of the file fingerprints at a time until the collation coincidence signal is obtained.

Incidentally, the predetermined number of reference feature points is determined in consideration of primarily the correctness and precision of collation and secondarily the number of input feature points which are actually available in the input streaked pattern. Usually, it is sufficient to use about thirty reference feature points. The prescribed angle, as recited in some of the appended claims, may be an eighth of 360° in the manner which will be understood from FIG. 7. For quicker collation, the prescribed angle may be a quarter of 360°. When very precise collation is desired, it is preferred to use 360°/256° as the prescribed angle. Such a prescribed angle can be selected by controlling the program memory 34 through the keyboard 46.

What is claimed is:

1. A streaked pattern collating apparatus comprising a collating unit supplied with an input pattern signal representative of an input streaked pattern featured by a plurality of input feature points, said collating unit being for carrying out collation between said input streaked pattern and a reference streaked pattern in connection with a predetermined number of reference feature points which feature said reference feature pattern by reference feature positions and reference streak directions, said collating unit producing collation coincidence and collation non-coincidence signals representing coincidence and non-coincidence between said input and said reference streaked patterns, said collating unit comprising:

memorizing means for memorizing said reference feature positions as memorized positions and said reference streak directions as memorized directions in correspondence to said reference feature points;

reading means connected to said memorizing means for reading from said memorizing means, as a readout feature position, a particular one of said memorized positions that corresponds to a particular one of said reference feature points and for reading from said memorizing means, as a read-out streak direction, a particular one of said memorized directions that corresponds to said particular one of the reference feature points;

direction extracting means connected to said reading means and supplied with said input pattern signal for extracting, as an extracted streak direction, a local streak direction from a local area defined by said read-out feature position in said input streaked pattern;

direction comparing means connected to said reading and said direction extracting means for comparing said extracted streak direction with said read-out streak direction to produce direction coincidence and direction non-coincidence signals representing coincidence and non-coincidence between said extracted streak direction and said read-out streak direction;

confirming means connected to said reading and said direction comparing means and supplied with said input pattern signal for confirming, in response to said direction coincidence signal, whether or not one of said input feature points is present in said local area, said confirming means producing presence confirmed and presence non-confirmed signals representing presence and absence of said one of the input feature points in said local area;

primary counting means connected to said confirming means and having a primary initial count equal to zero for counting up said primary initial count to a primary increased count whenever said presence confirmed signal is produced, said primary counting means producing a primary count signal representative of said primary increased count;

primary count comparing means connected to said primary counting means and having a primary threshold value for comparing said primary increased count with said primary threshold value, said primary threshold value being greater than said primary initial count and not greater than said predetermined number of reference feature points, said primary count comparing means producing first and second primary compared result signals when said primary increased count is less than said primary threshold value and when said primary increased count is not less than said primary threshold value, respectively, said second primary compared result signal being for use as said collation coincidence signal; and primary judging means connected to said memorizing, said reading, said direction comparing, said confirming, and said primary count comparing means for judging, in response to each of said direction non-coincidence signal, said presence non-confirmed signal, and said first primary compared result signal, whether or not all of said memorized positions and all of said memorized directions are already read from said memorizing means, said primary judging means producing an end signal and a non-end signal when all of said memorized positions and all of said memorized directions are already read and are not yet read from said memorizing means, respectively, said end signal being for use as said collation non-coincidence signal;

said reading means being responsive to said non-end signal for reading from said memorizing means, as said read-out feature position, a different one of said memorized positions that corresponds to a different one of said reference feature points and for reading from said memorizing means, as said read-out streak direction, a different one of said memorized directions that corresponds to said different one of the reference feature points;

said direction comparing means producing said direction coincidence and said direction non-coincidence signals when said extracted streak direction and said read-out streak direction form an angle which is not and is greater than a prescribed angle.

2. A streaked pattern collating apparatus as claimed in claim 1, wherein:

said memorizing means is for memorizing said memorized positions, said memorized directions, and adjacent ones of said reference feature points as memorized adjacent feature points in correspondence to said reference feature points, said adjacent ones of the reference feature points being nearest to said reference feature points, respectively;

said reading means being for reading from said memorizing means said particular one of the memorized points as said read-out feature position, said particular one of the memorized directions as said read-out streak direction, and a particular one of said memorized adjacent feature points as a read-out adjacent feature point, said particular one of the memorized adjacent feature points corresponding to said particular one of the reference feature points;

said primary judging means producing, as said non-end signal, a point indication signal indicative of a specific one of said reference feature points when said primary judging means judges in response to said first primary compared result signal that all of said memorized positions and all of said memorized directions are not yet read from said memorizing means, said specific one of the reference feature points corresponding to said read-out adjacent feature point;

said reading means being responsive to said point indication signal for reading from said memorizing means, as said different one of the memorized positions, a specific one of said memorized positions that corresponds to said specific one of the reference feature points, for reading from said memorizing means, as said different one of the memorized directions, a specific one of said memorized directions that corresponds to said specific one of the reference feature points, and for reading from said memorizing means a specific one of said memorized adjacent feature points that corresponds to said specific one of the reference feature points, said reading means producing said specific one of the memorized positions, said specific one of the memorized directions, and said specific one of the memorized adjacent feature points as said read out feature position, said read out streak direction, and said read-out adjacent feature point, respectively.

3. A streaked pattern collating apparatus as claimed in claim 1, wherein said primary judging means comprises:

secondary counting means connected to said direction comparing and said confirming means and having a secondary initial count equal to zero for counting up said secondary initial count to a secondary increased count whenever each of said direction non-coincidence signal and said presence non-confirmed signal is produced, said secondary counting means producing a secondary count signal representative of said secondary increased count;

secondary count comparing means connected to said secondary counting means and having a secondary threshold value for comparing said secondary increased count with said secondary threshold value, said secondary threshold value being greater than said secondary initial count and not greater than said predetermined number of feature points, said secondary cont comparing means producing first and second secondary compared result signals when said secondary increased count is less than said secondary threshold value and where said secondary increased count is not less than said secondary threshold value, respectively, said second secondary compared result signal being for use as said collation non-coincidence signal; and secondary judging means connected to said secondary count comparing means for judging, in response to said first secondary compared result signal, whether or not all of said memorized positions and all of said memorized directions are already read from said memorizing means, said secondary judging means producing said end signal and said non-end signal when all of said memorized positions and all of said memorized directions are already read and are not yet read from said memorizing means, respectively.

4. A streaked pattern collating apparatus comprising a collating unit supplied with an input pattern signal representative of an input streaked pattern featured by a plurality of input feature points, said collating unit being for carrying out collation between said input streaked pattern and a reference streaked pattern in connection with a predetermined number of reference feature points which feature said reference feature pattern by reference feature positions and reference streak directions, said collating unit producing collation coincidence and collation non-coincidence signals representing coincidence and non-coincidence between said input and said reference streaked patterns, said collating unit comprising:

memorizing means for memorizing said reference feature positions as memorized positions, said reference streak directions as memorized directions, and adjacent positions of adjacent ones of said reference feature points as memorized adjacent positions in correspondence to said reference feature points, said adjacent ones of the reference feature points being nearest to said reference feature points, respectively;

reading means connected to said memorizing means for reading from said memorizing means, as a read-out feature position, a particular one of said memorized positions that corresponds to a particular one of said reference feature points, for reading from said memorizing means, as a read-out streak direction, a particular one of said memorized directions that corresponds to said particular one of the reference feature points, and for reading from said memorizing means, as a read-out adjacent position, a particular one of said memorized adjacent positions that corresponds to said particular one of the reference feature points;

direction extracting means connected to said reading means and supplied with said input pattern signal for extracting, as an extracted streak direction, a local streak direction from a local area defined by said read-out feature position in said input streaked pattern;

direction comparing means connected to said reading and said direction extracting means for comparing said extracted streak direction with said read-out streak direction to produce direction coincidence and direction non-coincidence signals representing coincidence and non-coincidence between said extracted streak direction and said read-out streak direction;

first confirming means connected to said reading and said direction comparing means and supplied with said input pattern signal for confirming, in response to said direction coincidence signal, whether or not a particular one of said input feature points is present in said local area, said first confirming means producing first presence confirmed and first presence non-confirmed signals representing presence and absence of said particular one of the input feature points in said local area;

second confirming means connected to said reading and said first confirming means and supplied with said input pattern signal for confirming, in response to said first presence confirmed signal, whether or not a different one of said input feature points is present in a different local area defined by said read-out adjacent position in said input streaked pattern, said second confirming means producing second presence confirmed and second presence non-confirmed signals representing presence and absence of said different one of the input feature points in said different local area;

primary counting means connected to said second confirming means and having a primary initial count equal to zero for counting up said primary initial count to a primary increased count whenever said second presence confirmed signal is produced, said primary counting means producing a primary count signal representative of said primary increased count;

primary count comparing means connected to said primary counting means and having a primary threshold value for comparing said primary increased count with said primary threshold value, said primary threshold value being greater than said primary initial count and not greater than said predetermined number of reference feature points, said primary count comparing means producing first and second primary compared result signals when said primary increased count is less than said primary threshold value and when said primary increased count is not less than said primary threshold value, respectively, said second primary compared result signal being for use as said collation coincidence signal; and primary judging means connected to said memorizing, said reading, said direction comparing, said first and said second confirming, and said primary count comparing means for judging, in response to each of said direction non-coincidence signal, said first and said second presence non-confirmed signals, and said first primary compared result signal, whether or not all of said memorized positions and all of said memorized directions are already read from said memorizing means, said primary judging means producing an end signal and a non-end signal when all of said memorized positions and all of said memorized directions are already read and are not yet read from said memorizing means, respectively, said end signal being for use as said collation non-coincidence signal;

said reading means being responsive to said non-end signal for reading from said memorizing means, as said read-out feature position, a different one of said memorized positions that corresponds to a different one of said reference feature points, for reading from said memorizing means, as said read-out streak direction, a different one of said memorized directions that corresponds to said different one of the reference feature points, and for reading from said memorizing means, as said read-out adjacent position, a different one of said memorized adjacent positions that corresponds to said different one of the reference feature points.

5. A streaked pattern collating apparatus as claimed in claim 4, wherein said direction comparing means produces said direction coincidence and said direction non-coincidence signals when said extracted streak direction and said read-out streak direction form an angle which is not and is greater than a prescribed angle.

6. A streaked pattern collating apparatus as claimed in claim 4, wherein said primary judging means comprises:

secondary counting means connected to said direction comparing and said confirming means and having a secondary initial count equal to zero for counting up said secondary initial count to a secondary increased count whenever each of said direction non-coincidence signal and said first and said second presence non-confirmed signals is produced, said secondary counting means producing a secondary count signal representative of said secondary increased count;

secondary count comparing means connected to said secondary counting means and having a secondary threshold value for comparing said secondary increased count with said secondary threshold value, said secondary threshold value being greater than said secondary initial count and not greater than said predetermined number of feature points, said secondary count comparing means producing first and second secondary compared result signals when said secondary increased count is less than said secondary threshold value and when said secondary increased count is not less than said secondary threshold value, respectively, said second secondary compared result signal being for use as said collation non-coincidence signal; and secondary judging means connected to said secondary count comparing means for judging, in response to said first secondary compared result signal, whether or not all of said memorized positions and all of said memorized directions are already read from said memorizing means, said secondary judging means producing said end signal and said non-end signal when all of said memorized positions and all of said memorized directions are already read and are not yet read from said memorizing means.

7. A streaked pattern collating apparatus comprising a collating unit supplied with an input pattern signal representative of an input streaked pattern featured by a plurality of input feature points, said collating unit being for carrying out collation between said input streaked pattern and a reference streaked pattern in connection with a predetermined number of reference feature points which feature said reference feature pattern by reference feature positions and reference streak directions, said collating unit producing collation coincidence and collation non-coincidence signals representing coincidence and non-coincidence betwen said input and said reference streaked patterns, said collating unit comprising:

memorizing means for memorizing said reference feature positions as memorized positions, said reference streak directions as memorized directions, adjacent positions of adjacent ones of said reference feature points as memorized adjacent positions, and local reference streak numbers as memorized numbers in correspondence to said reference feature points, said adjacent ones of the reference feature points being nearest to said reference feature points, respectively, each of said local reference streak numbers representing the number of local reference streaks between each of said reference feature points and one of said adjacent ones of the reference feature points that corresponds to said each of the reference feature points;

reading means connected to said memorizing means for reading from said memorizing means, as a read-out feature position, a particular one of said memorized positions that corresponds to a particular one of said reference feature points, for reading from said memorizing means, as a read-out streak direction, a particular one of said memorized directions that corresponds to said particular one of the reference feature pints, and for reading from said memorizing means, as a read-out adjacent position, a particular one of said memorized adjacent positions that corresponds to said particular one of the reference feature points, and for reading from said memorizing means, as a read-out local reference streak number, a particular one of said memorized numbers that corresponds to said particular one of the reference feature points;

direction extracting means connected to said reading means and supplied with said input pattern signal for extracting, as an extracted streak direction, a local streak direction from a local area defined by said read-out feature position in said input streaked pattern;

direction comparing means connected to said reading and said direction extracting means for comparing said extracted streak direction with said read-out streak direction to produce direction coincidence and direction non-coincidence signals representing coincidence and non-coincidence between said extracted streak direction and said read-out streak direction;

first confirming means connected to said reading and said direction comparing means and supplied with said input pattern signal for confirming, in response to said direction coincidence signal, whether or not a particular one of said input feature points is present in said local area, said first confirming means producing first presence confirmed and first presence non-confirmed signals representing presence and absence of said particular one of the input feature points in said local area;

second confirming means connected to said reading and said first confirming means and supplied with said input pattern signal for confirming, in response to said first presence confirmed signal, whether or not a different one of said input feature points is present in a different local area defined by said read-out adjacent position in said input streaked pattern, said second confirming means producing second presence confirmed and second presence non-confirmed signals representing presence and absence of said different one of the input feature points in said different local area;

number extracting means connected to said reading and said second confirming means and supplied with said input pattern signal for extracting in response to said second presence confirmed signal, as an extracted local input streak number, the number of local input streaks between said particular one of the input feature points and said different one of the input feature points in said input streaked pattern;

number comparing means connected to said reading and said number extracting means for comparing said extracted local input streak number with said read-out local reference streak number to produce number coincidence and number non-coincidence signals representing coincidence and non-coincidence between said extracted local input streak number and said read-out local reference streak number;

primary counting means connected to said number comparing means and having a primary initial count equal to zero for counting up said primary initial count to a primary increased count whenever said number coincidence signal is produced, said primary counting means producing a primary count signal representative of said primary increased count;

primary count comparing means connected to said primary counting means and having a primary threshold value for comparing said primary increased count with said primary threshold value, said primary threshold value being greater than said primary inital count and not greater than said predetermined number of reference feature points, said primary count comparing means producing first and second primary compared result signals when said primary increased count is less than said primary threshold value and when said primary increased count is not less than said primary threshold value, respectively, said second primary compared result signal being for use as said collation coincidence signal; and primary judging means connected to said memorizing, said reading, said direction comparing, said first and said second confirming, said number comparing, and said primary count comparing means for judging, in response to each of said direction non-coincidence signal, said first and said second presence non-confirmed signals, said number non-coincidence signal, and said first primary compared result signal, whether or not all of said memorized positions and all of said memorized directions are already read from said memorizing mens, said primary judging means producing an end signal and a non-end signal when all of said memorized positions and all of said memorized directions are already read and are not yet read from said memorizing means, respectively, said end signal being for use as said collation non-coincidence signal;

said reading means being responsive to said non-end signal for reading from said memorizing means, as said read-out feature position, a different one of said memorized positions that corresponds to a different one of said reference feature points, for reading from said memorizing means, as said read-out streak direction, a different one of said memorized directions that corresponds to said different one of the reference feature points, for reading from said memorizing means, as said read-out adjacent position, a different one of said memorized adjacent positions that corresponds to said different one of the reference feature points, and for reading from said memorizing means, as said read-out local reference streak number, a different one of said memorized numbers that corresponds to said different one of the reference feature points.

8. A streaked pattern collating apparatus as claimed in claim 7, wherein said direction comparing means produces said direction coincidence and said direction non-coincidence signals when said extracted streak direction and said read-out streak direction form an angle which is not and is greater than a prescribed angle.

9. A streaked pattern collating apparatus as claimed in claim 7, wherein said primary judging means comprises:

secondary counting means connected to said direction comparing and said confirming means and having a secondary initial count equal to zero for counting up said secondary initial count to a secondary increased count whenever each of said direction non-coincidence signal, said first and said second presence non-confirmed signals, and said number non-coincidence signal is produced, said secondary counting means producing a secondary count signal representative of said secondary increased count;

secondary count comparing means connected to said secondary counting means for having a secondary threshold value for comparing said secondary increased count with said secondary threshold value. said secondary threshold value being greater than said secondary initial count and not greater than said predetermined number of feature points, said secondary count comparing means producing first and second secondary compared result signals when said secondary increased count is less than said secondary threshold value and when said secondary increased count is not less than said secondary threshold value. respectively. said second secondary compared result signal being for use as said collation non-coincidence signal: and secondary judging means connected to said secondary count comparing means for judging. in response to said first secondary compared result signal. whether or not all of said memorized positions an all of said memorized directions are already read from said memorizing means. said secondary judging means producing said end signal and said non-end signal when all of said memorized positions and all of said memorized directions are already read and are not yet read from said memorizing means.

* * * * *

UNITED STATES PATENT AND TRADEMARK OFFICE
CERTIFICATE OF CORRECTION

PATENT NO. : 5,177,792

DATED : Jan. 5, 1993

INVENTOR(S) : Koichiro MORITA

It is certified that error appears in the above-identified patent and that said Letters Patent is hereby corrected as shown below:

Col. 5, line 54, delete "guantized" and insert --quantized--.

Col. 6, line 25, after "CPU", insert --35--.

Col. 8, line 28, delete "non-cofirmed" and insert --non-confirmed--;

Col. 8, line 39, delete "senventh" and insert --seventh--.

Col. 9, line 37, delete "momorized" (both occurrences) and insert --memorized--;

Col. 9, line 62, delete "bace" and insert --back--.

Col. 10, line 24, delete "statges" and insert --stage--;

Col. 10, line 30, delete "non/coincidence" and insert --non-coincidence--;

Col. 10, line 44, delete "thereshold" and insert --threshold--;

Col. 10, line 51, delete "thereshold" and insert --threshold--;

Col. 10, line 60, delete "thereshold" and insert --threshold--;

Col. 10, line 64, after "CPU", insert --35--.

UNITED STATES PATENT AND TRADEMARK OFFICE
CERTIFICATE OF CORRECTION

PATENT NO. : 5,177,792
DATED : Jan. 5, 1993
INVENTOR(S) : Koichiro MORITA It is certified that error appears in the above-identified patent and that said Letters Patent is hereby corrected as shown below:

Col. 11, line 41, delete "adjacet" and insert --adjacent--.

Col. 22, line 38, delete "betwen" and insert --between--.

Signed and Sealed this

Seventh Day of December, 1993

Attest:

BRUCE LEHMAN

Attesting Officer     Commissioner of Patents and Trademarks